No. 692,338. Patented Feb. 4, 1902.
G. N. PHELPS.
INSTEP ARCH SUPPORTER.
(Application filed Nov. 23, 1901.)
(No Model.)

WITNESSES
G. A. Rockwell.
C. B. Maynadier

INVENTOR
George N. Phelps
by J. E. Maynadier
Attorney

# UNITED STATES PATENT OFFICE.

GEORGE N. PHELPS, OF BROOKLINE, MASSACHUSETTS.

INSTEP-ARCH SUPPORTER.

SPECIFICATION forming part of Letters Patent No. 692,338, dated February 4, 1902.

Application filed November 23, 1901. Serial No. 83,428. (No model.)

*To all whom it may concern:*

Be it known that I, GEORGE N. PHELPS, of Brookline, in the county of Norfolk and State of Massachusetts, have invented an Improved Instep-Arch Supporter, of which the following is a specification, reference being had to the accompanying drawings, making part hereof.

Instep-arch supporters have long been on the market; but heretofore they have not been capable of any adjustment except by reshaping the metal stiffening-plate, which was not only a difficult matter, but, in addition, the adjustment was always crude and imperfect.

The object of my invention is to make these supporters so that they may be fitted accurately to feet requiring more or less support under the instep, and my invention is the adjusting-plate described below and its combination with an instep-arch supporter.

Figure 1:
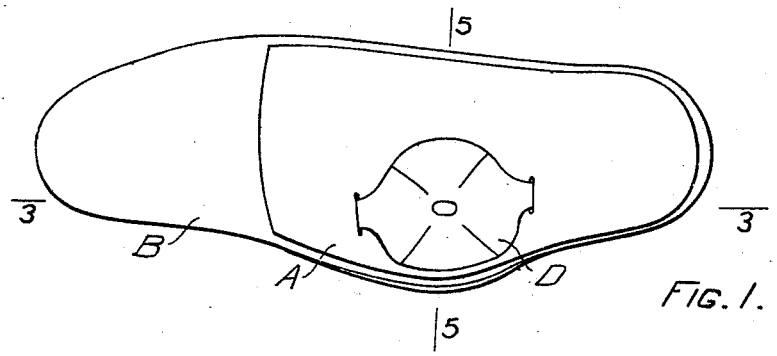
Figure 2:
Figure 4:
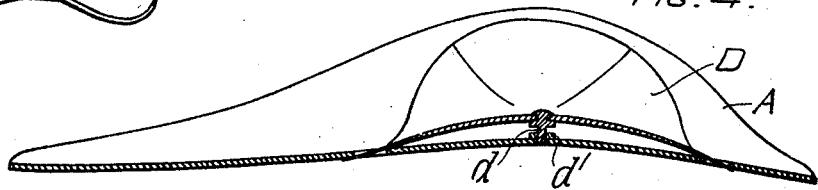
Figure 3:
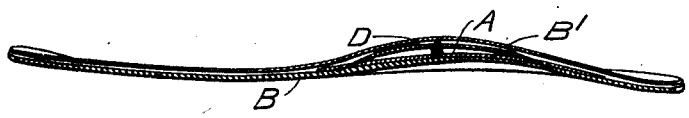
Figure 5:
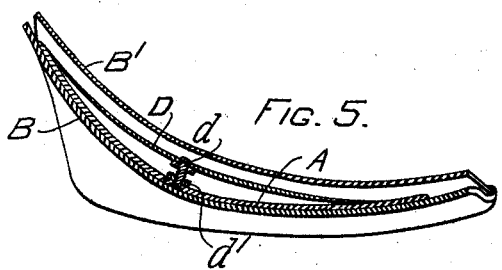

Figure 1 is a plan of my instep-arch supporter with its lining omitted. Fig. 2 is a perspective view, on a smaller scale, of one of my supporters. Fig. 3 is a section on line 3 3 of Fig. 1 with the lining removed from contact with the adjusting-plate for clearness. Fig. 4 is a section, on a larger scale, through the stiffening-plate and my adjusting-plate on the same line as Fig. 3. Fig. 5 is a section on line 5 5 of Fig. 1.

In the drawings, A is the stiffening-plate, and B the sole-piece, which is attached to the stiffening-plate, the two together forming an article resembling an inner sole, but with a side extension, so that the supporter extends under the instep of the foot and also under the side of the foot near the instep. The sole-piece B and lining B' are secured one to the upper surface and the other to the lower surface of the two plates A and D.

My adjusting-plate D is shaped on its lower surface to fit the continuous surface of the stiffening-plate A, and its upper surface has much the same main curves as the upper surface of plate A, but more pronounced, and its curvature can be made more or less by the screw $d$ and nut $d'$, that nut being rigidly connected with the stiffening-plate A, so that the main curves of my arch-supporter can be varied as desired by turning the screw $d$.

Of course a set of several adjusting-plates may be made for each size of arch-supporter, each plate of that set being graded; but in practice it is rare that the desired adjustment cannot be obtained with one adjusting-plate, and these additional graded adjusting-plates are of infrequent use.

My adjusting-plates are preferably made of sheet-steel, as the initial shape can then be given by molding or swaging; but they may of course be made of other tough sheet material—such as hard rubber, celluloid, or leather—for the main novelty of my invention is an instep-arch supporter with two stiffening-plates, one, A, as usual, and the other, D, adjustable on A, so that not only can the supporter be at the start exactly fitted to the foot of the wearer, but, what is even more important, the fit can be varied to suit the wearer after a short use. At present the fit depends wholly upon the curvature of the plate A, and after that plate has been carefully curved to fit it is commonly found that it must be altered somewhat after it has been used a day or two, when the supporter has to be returned to the dealer and the stiffening-plate recurved to suit the new condition of the foot due to the change in the foot resulting from the use of the supporter.

What I claim as my invention is—

1. The improved instep-arch supporter composed of a stiffening-plate and its sole-shaped attachments, in combination with an adjusting-plate, and means to vary the curvature of the surface of the adjusting-plate.

2. The adjusting-plate above described curved to fit at its edges on the stiffening-plate of an instep-arch supporter and with means to hold it adjustably to that stiffening-plate, substantially as and for the purpose specified.

GEORGE N. PHELPS.

Witnesses:
J. E. MAYNADIER,
G. A. ROCKWELL.